Nov. 6, 1962  R. G. SMITH  3,062,085
TONE-COLOR PROJECTOR
Filed Dec. 1, 1960  3 Sheets-Sheet 1

INVENTOR.
ROGER G. SMITH
BY
Knox & Knox

Nov. 6, 1962 R. G. SMITH 3,062,085
TONE-COLOR PROJECTOR
Filed Dec. 1, 1960 3 Sheets-Sheet 2
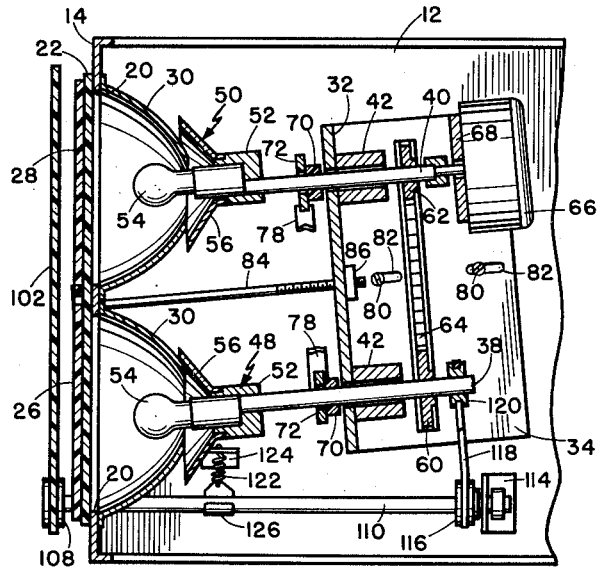
Fig. 3
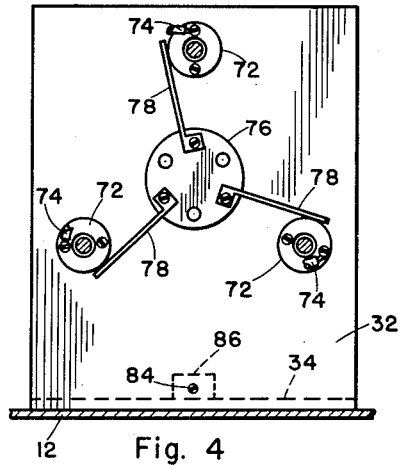
Fig. 4
Fig. 5
Fig. 6
INVENTOR.
ROGER G. SMITH
BY Knox & Knox Nov. 6, 1962
R. G. SMITH
3,062,085
TONE-COLOR PROJECTOR
Filed Dec. 1, 1960
3 Sheets-Sheet 3
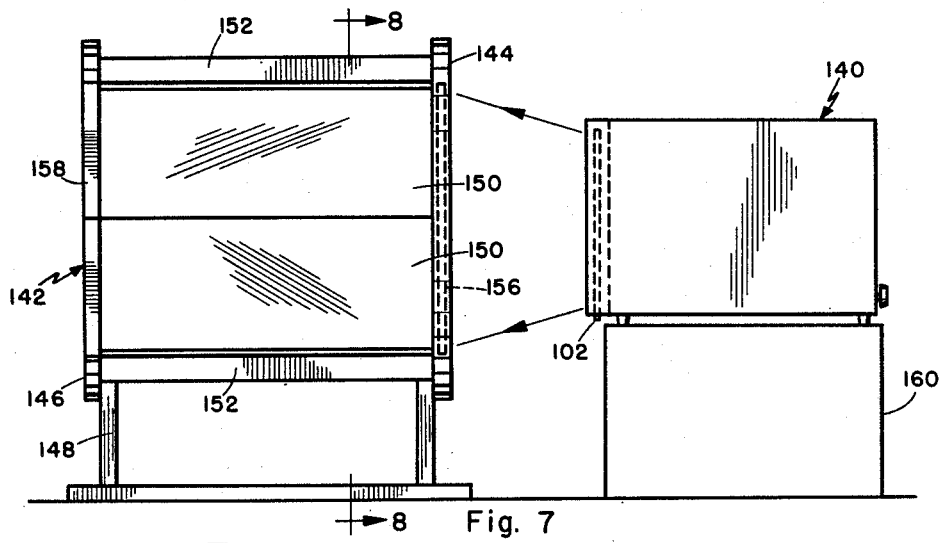
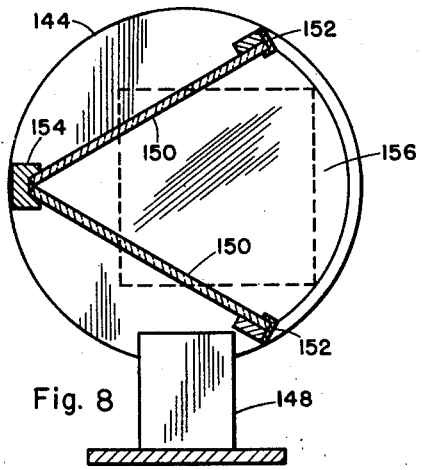
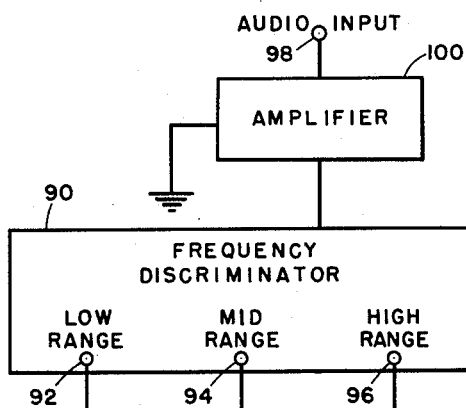
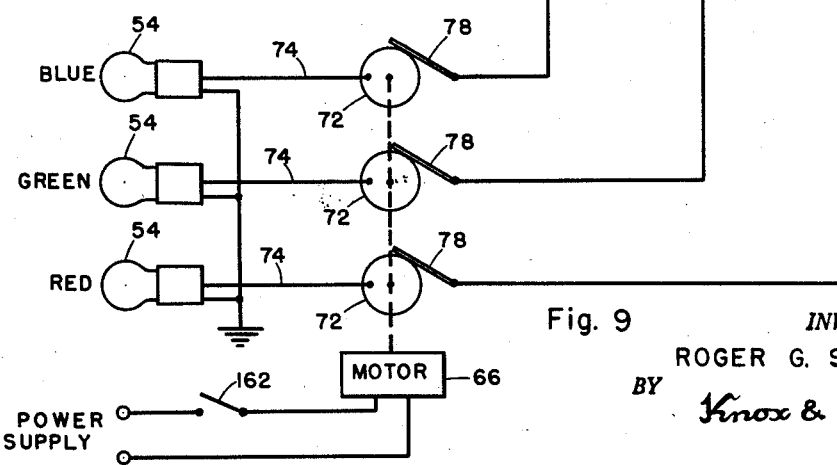
INVENTOR.
ROGER G. SMITH
BY Knox & Knox

United States Patent Office 3,062,085
Patented Nov. 6, 1962

3,062,085
TONE-COLOR PROJECTOR
Roger G. Smith, 4213 Euclid Ave., San Diego, Calif.
Filed Dec. 1, 1960, Ser. No. 73,027
10 Claims. (Cl. 84—464)

The present invention relates generally to optical devices and more particularly to a tone-color projector.

The primary object of this invention is to provide a projector which exhibits a constantly changing visual pattern, the colors of which are controlled and varied by the output of an audio amplifier fed through a frequency discriminator, each individual color being operated by a particular range of frequencies.

Another project of this invention is to provide a projector in which the projection lamps are energized entirely by the audio amplifier output and thus vary in brillance with variations in amplitude.

Another object of this invention is to provide a projector in which the projection lamps are rotated eccentrically at different rates inside concave reflectors, the constantly changing focus causing additional variation in the display.

A further object of this invention is to provide a projector in which the rotational axes of the lamps are disposed obliquely to the focal axes of the reflectors, so that the rotating lamps also move axially about the focal points.

Still another object of this invention is to provide a projector in which an assembly of randomly shaped interference patterns is rotated in front of the projection lamps to intermix changing shadows with the colored lights.

An additional object of this invention is to provide a projector which can be used in conjunction with a kaleidoscope type display for multiple pattern effects.

Fnally, it is an object to provide a tone-color projector of the abovementioned character which is simple and convenient to operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIG. 3 is a fragmentary sectional view taken on the line 3—3 of FIG. 2;

FIG. 4 is a sectional view taken on the line 4—4 of FIG. 2;

FIG. 5 is a sectional view taken on the line 5—5 of FIG. 2;

FIG. 6 is a front elevation view of the projector, as taken from the left end of FIG. 1;

FIG. 7 is a side elevation view, on a reduced scale, showing the projector in use with a kaleidoscope apparatus;

FIG. 8 is a sectional view taken on the line 8—8 of FIG. 7; and

FIG. 9 is a wiring diagram of the projector.

Similar characters of reference indicate similar or identical elements and portions throughout the specification and throughout the views of the drawings.

Figure 1:
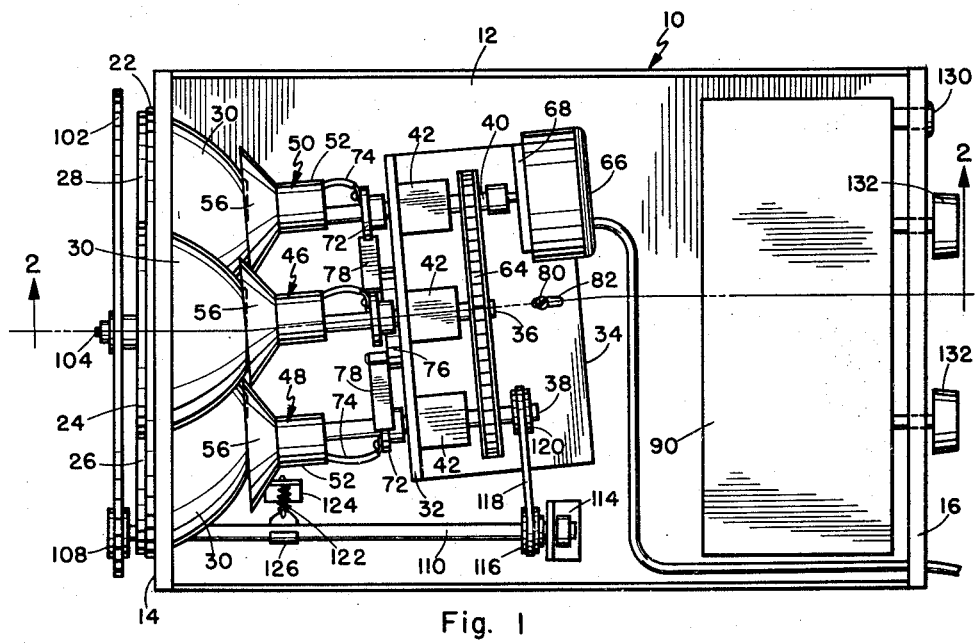
FIG. 1 is a top plan view of the projector, with the cover removed.

The projector is built on a generally rectangular frame 10 having a base plate 12, an upright front panel 14 and a back panel 16, the mechanism being enclosed by a cover 18. The front panel 14 has three circular openings 20 arranged in a triangular pattern, the front of the openings being covered by a transparent window 22 carrying three colored filters 24, 26 and 28 in alignment with the openings. The filters may be of any desired colors, the combination of blue, green and red having been found to be particularly effective. Each opening 20 is fitted with a concave, polished reflector 30 fixed to the rear face of the front panel 14, the rear portion of each reflector being open.

Rearwardly of the reflectors 30 is an upright mounting panel 32 having a base flange 34 which is attached to the base plate 12. On the mounting panel 32 are three shafts 36, 38 and 40 rotatably held in bearings 42 and having parallel, horizontal axes spaced to correspond with the focal axes of the reflectors 30. On the forward ends of shafts 36, 38 and 40, respectively, are mounted lamp assemblies 46, 48 and 50, each comprising a socket 52 holding a lamp 54 and a small conical diffusion reflector 56 having an unpolished surface. The lamp assemblies are mounted eccentrically on their respective shafts and are positioned so that the lamps 54 project into the reflectors 30, the diffusion reflectors 56 covering the open ends of the main reflectors, with sufficent clearance to allow eccentric rotation.

The rear ends of shafts 36, 38 and 40 are fitted with sprockets 58, 60 and 62, respectively, each of the sprockets being of a different size and all three being coupled by an endless drive chain 64. The shaft 40 is connected to a small, low speed motor 66 mounted on a support bracket 68 on the base flange 34, the shafts thus being turned simultaneously at different speeds. On each of the shafts, in front of the mounting panel 32, is an insulated collar 70 carrying a conductive contact ring 72, insulated from the shaft itself which serves as a ground. From each contact ring 72 a conductor 74 extends to one terminal of the respective lamp socket 52, the other terminal being grounded to its shaft. On the mounting panel 32, centrally between the shafts, is an insulating plate 76 carrying three resilient wiper arms 78, which bear on and make electrical connections with the contact rings 72.

To increase the variable focus effect of the lamps, the mounting panel 32 is angularly disposed so that the shafts 36, 38 and 40 are angularly disposed in the horizontal plane relative to the axes of reflectors 30. Thus the lamps 54, while rotating eccentrically about the axes of reflectors 30, also move axially relative to the respective focal points and provide constantly changing focal relationships. The base flange 34 is secured to the base plate 12 by screws 80 through slots 82, allowing for axial adjustment of the entire lamp and drive assembly. This is accomplished by a threaded focusing rod 84 engaging a threaded block 86 on the base flange 34, said focusing rod projecting from the front panel 14 and being fitted with a knob 88.

The lamps 54 do not have an independent power supply but are energized entirely by electrical signals from an audio amplifier source. In the rear portion of the frame 10 is a frequency discriminator 90 capable of dividing a wide frequency range input into separate bands of frequencies. The electrical circuit of such a frequency discriminator is well known and is not a specific part of the present disclosure. An example of a suitable unit is the type used as a crossover network in a high fidelity speaker system, where different frequencies are distributed to different speakers, provision being made for some overlap to avoid abrupt separation of the frequency ranges. The frequency discriminator 90 is illustrated as having three outputs 92, 94 and 96 for low, mid and high ranges, respectively, the outputs being connected to the wiper arms 78 to energize the individual lamps 54, as indicated in FIG. 9.

An audio signal is obtained from an input 98 through an amplifier 100, which is grounded to the common ground of the lamps 54 to complete the lamp circuits, the amplifier output being fed through the frequency discriminator 90 for separation into the various ranges. The audio source can be a record player, radio, an electrical or electronic musical instrument, or a microphone to pick up any desired sounds, even special sound effects. In the wiring diagram, the low range output energizes the lamp illuminating the blue filter, the green represents the middle range and the red the high range. A low pitched or bass audio input thus produces a blue light at the front of the apparatus, the intensity being proportional to the volume or signal magnitude. Similarly a high pitched input produces a red light and normally both will have some overlap into the green, since most audio sources other than pure tones cover a reasonable range of frequencies.

To obtain the proper effect the colored lights are projected on ground glass, flashed opal glass, a back projection screen, or a conventional screen of suitable size. The projected light will be distributed on the screen with portions overlapped and the colors blended, the colors varying individually in intensity corresponding to the volume of particular portions of the audio input. A diffused glow is provided by the diffusion reflectors 56, while the polished reflectors 30 provide intensified zones of light, the shapes of which are constantly changing and gyrating due to the out-of-focus motions of the lamps.

Figure 2:
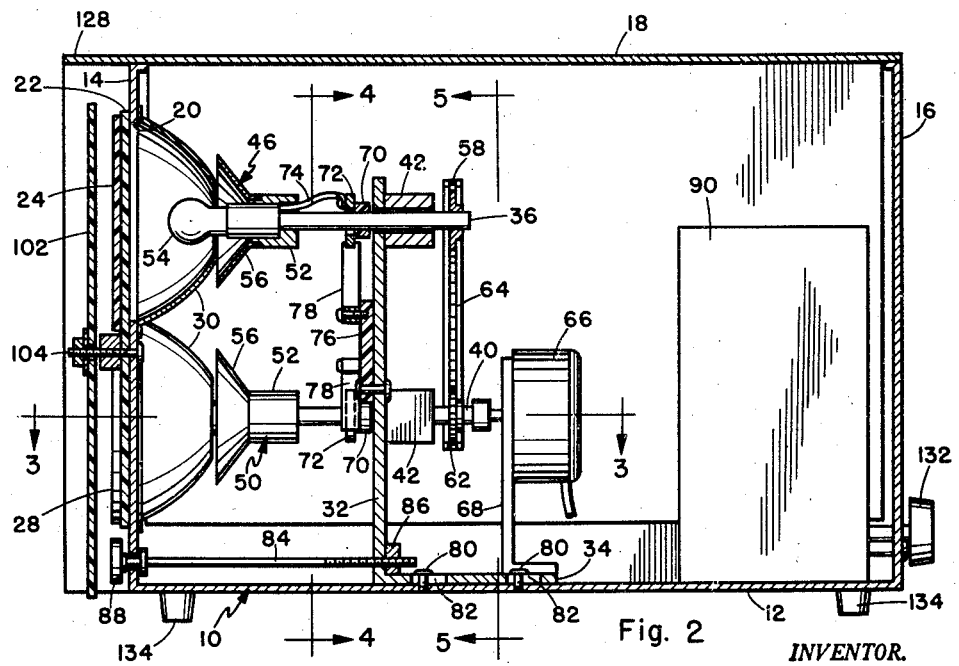
FIG. 2 is a sectional view taken on the line 2—2 of FIG. 1.

To heighten the effect of variation, a transparent interference disc 102 is mounted in front of the colored filters 24, 26 and 28, the disc being freely rotatable on a central bearing pin 104 fixed in the front panel 14. Fastened to the face of the interference disc 102 are opaque patterns 106 of random shapes, as indicated in FIG. 6, which introduce shadows into the changing light pattern. The disc 102 is turned slowly by a frictional drive wheel 108 on a drive shaft 110, one end of which extends through a slotted opening 112 in the front panel 14, so that the drive wheel engages the edge of said disc. The other end of the drive shaft 110 is journalled in a bearing bracket 114 on the base plate 12 and is fitted with a pulley 116, coupled by a belt 118 to a further pulley 120 on the shaft 38. To maintain driving contact, the drive wheel 108 is biased against the disc 102 by a spring 122 stretched between a fixed lug 124 and a clip 126 engaging the drive shaft 110. To protect the interference disc 102, the cover 18 has a forwardly extended shroud portion 128, as in FIG. 2.

For convenience, the frequency discriminator 90 has a conventional jack 130 into which the amplifier 100, or other audio source is plugged. The overlap controls, indicated at 132, may be extended from the backpanel 16 for adjustment of color combination. The base plate 12 is preferably fitted with rubber or plastic feet 134 to prevent damage to finished surfaces.

A particularly effective use of the apparatus is illustrated in FIGS. 7 and 8, in which the projector, indicated generally at 140, is combined with a kaleidoscope unit 142. The arrangement of the kaleidoscope unit may vary considerably, that illustrated comprising a pair of end plates 144 and 146 mounted on a stand 148, a pair of flat mirrors 150 being supported longitudinally between the end plates by retaining bars 152 and 154. The mirrors 150 are angularly disposed to each other and meet along one longitudinal edge in the V-shaped configuration of the well known kaleidoscope reflector. The end plate 144 has a V-shaped opening in which is fitted a translucent screen 156, the end plate 146 having a cut-out portion 158 for visibility. The apparatus is set up with the projector 140 on a suitable support 160 and focused to project the light pattern on the screen 156. When viewed from the open end of the kaleidoscope through the cut-out portion 158, the varying light pattern will be repeated in multiple.

The overall effect is very pleasing, the colors and light and dark patterns reflecting the mood and characteristics of the audio input, particularly in the case of musical accompaniment. The primary reason for such close coordination of audio and visual effects is the use of the audio input as the sole source of power for the projection lamps, a power supply and variable voltage means being unnecessary. Only the motor 66 requires a power supply in the projector itself and this can be controlled by a suitable switch 162, as in FIG. 9. The amplifier is a separate unit and is operated in the normal manner. For use in a normal sized room, the output of a reasonable audio amplifier is ample to energize small lamps. However, if a large display is required, the signals from the frequency discriminator may be individually amplified by additional stages, without affecting the relative frequency and amplitude variations.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variations from the form of the invention disclosed herein may be made without departure from the spirit and scope of the invention, and that the spicification and drawings are to be considered as merely illustrative rather than limiting.

I claim:

1. A tone-color projector, comprising: a frame having an upright front panel; a plurality of openings in said front panel; colored optical filters mounted on said front panel and covering said openings; a plurality of concave reflectors fixed to said front panel in alignment with said filters; a support attached to said frame; a plurality of lamps mounted on said support and extending into said reflectors; means operatively connected to said lamps to rotate the lamps eccentrically relative to the foci of said reflectors; an audio amplifier having an output; a frequency discriminator coupled to said amplifier output and having a plurality of outputs each providing an electrical signal corresponding to a specific range of audio frequencies; each of said frequency discriminator outputs being connected to one of said lamps and providing the sole source of power therefor.

2. A tone-color projector according to claim 1 and including means to move said lamps axially relative to said reflectors, simultaneously with the eccentric rotation thereof.

3. A tone-color projector according to claim 1 and including a transparent disc rotatably mounted in front of said color filters; a plurality of substantially opaque interference patterns on said disc; and means to rotate said disc slowly.

4. A tone-color projector, comprising: a frame having an upright front panel; a plurality of openings in said front panel; colored optical filters mounted on said front panel and covering said openings; a plurality of concave reflectors fixed to said front panel in alignment with said filters; a support attached to said frame; a plurality of lamps mounted on said support and extending into said reflectors; means operatively connected to said lamps to rotate the lamps eccentrically relative to the foci of said reflectors; the rotational axes of said lamps being angularly disposed in one plane to the focal axes of said reflectors, whereby the lamps move axially of the reflector foci simultaneously with the eccentric motion thereof; an audio amplifier having an output; a frequency discriminator coupled to said amplifier output and having a plurality of outputs each providing an electrical signal corresponding to a specific range of audio frequencies; each of said frequency discriminator outputs being connected to one of said lamps and providing the sole source of power therefor.

5. A tone-color projector according to claim 4, wherein said lamps are rotated at different speeds.

6. A tone-color projector, comprising: a frame having an upright front panel; a plurality of openings in said front panel spaced about a common center; a colored optical filter fixed in front of each of said openings; a concave, polished reflector fixed behind each of said openings to direct light through the respective filter; said reflectors having open rear ends; a support on said frame; a plurality of parallel shafts rotatably mounted on said support on axes spaced to correspond with the focal axes of said reflectors; a lamp assembly eccentrically mounted on each of said shafts and extending into one of said reflectors; a motor operatively connected to rotate said shafts simultaneously; an audio amplifier having an output; a frequency discriminator coupled to said amplifier output and having a plurality of outputs each providing an electrical signal corresponding to a specific range of audio frequencies; each of said frequency discriminator outputs being connected to one of said lamps and providing the sole source of power therefor.

7. A tone-color projector, comprising: a frame having an upright front panel; a plurality of openings in said front panel spaced about a common center; a colored optical filter fixed in front of each of said openings; a concave, polished reflector fixed behind each of said openings to direct light through the respective filter; said reflectors having open rear ends; a support on said frame; a plurality of parallel shafts rotatably mounted on said support on axes spaced to correspond with the focal axes of said reflectors; a lamp assembly eccentrically mounted on each of said shafts and extending into one of said reflectors; said support being inclined and the rotational axes of said shafts being angularly disposed in one plane to the focal axes of said reflectors, whereby said lamp assemblies move axially relative to the foci of the reflectors while rotating eccentrically therein; a motor operatively connected to rotate said shafts simultaneously; an audio amplifier having an output; a frequency discriminator coupled to said amplifier output and having a plurality of outputs each providing an electrical signal corresponding to a specific range of audio frequencies; each of said frequency discriminator outputs being connected to one of said lamps and providing the sole source of power therefor.

8. A tone-color projector according to claim 7, wherein each of said lamp assemblies includes a small, unpolished reflector substantially covering the open end of the respective polished reflector and fixed to rotate with the lamp assembly.

9. A tone-color projector, comprising: a frame having an upright front panel; a plurality of openings in said front panel spaced about a common center; a colored optical filter fixed in front of each of said openings; a concave, polished reflector, fixed behind each of said openings to direct light through the respective filter; said reflectors having open rear ends; a support on said frame; a plurality of parallel shafts rotatably mounted on said support on axes spaced to correspond with the focal axes of said reflectors; a lamp assembly eccentrically mounted on each of said shafts and extending into one of said reflectors; said support being inclined and the rotational axes of said shafts being angularly disposed in one plane to the focal axes of said reflectors, whereby said lamp assemblies move axially relative to the foci of the reflectors while rotating eccentrically therein; driving means operatively connected to said shafts to rotate each shaft at a different speed; an audio amplifier having an output; a frequency discriminator coupled to said amplifier output and having a plurality of outputs each providing an electrical signal corresponding to a specific range of audio frequencies; each of said frequency discriminator outputs being connected to one of said lamps and providing the sole source of power therefor.

10. A tone-color projector according to claim 9 and including a transparent disc rotatably mounted on said front panel in front of said filters; a plurality of substantially opaque interference patterns on said disc; said driving means being operatively connected to rotate said disc.

References Cited in the file of this patent
UNITED STATES PATENTS

| | | |
|---|---|---|
| 1,690,279 | Craft | Nov. 6, 1928 |
| 1,891,216 | Hough | Dec. 13, 1932 |
| 1,946,026 | Lewis et al. | Feb. 6, 1934 |
| 2,041,412 | Homrighous | May 19, 1936 |
| 2,131,934 | Burchfield | Oct. 4, 1938 |
| 2,677,297 | Wetzel | May 4, 1954 |